United States Patent
Roether et al.

(10) Patent No.: US 8,096,395 B2
(45) Date of Patent: Jan. 17, 2012

(54) PRESSURE-REGULATED FRICTION CLUTCH

(75) Inventors: Friedbert Roether, Cleebronn (DE); Joachim Delfs, Hemmingen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 1016 days.

(21) Appl. No.: 10/538,385

(22) PCT Filed: Dec. 9, 2003

(86) PCT No.: PCT/EP03/01937
§ 371 (c)(1),
(2), (4) Date: Mar. 27, 2008

(87) PCT Pub. No.: WO2004/053349
PCT Pub. Date: Jun. 24, 2004

(65) Prior Publication Data
US 2008/0202886 A1  Aug. 28, 2008

(30) Foreign Application Priority Data
Dec. 11, 2002  (DE) .................................. 102 57 866

(51) Int. Cl.
*F16D 25/08* (2006.01)
(52) U.S. Cl. ............... 192/85.49; 192/70.28; 192/109 A
(58) Field of Classification Search ............... 192/85.48, 192/85.49, 85.5, 85.51, 85.34, 85.39, 109 A
See application file for complete search history.

(56) References Cited

U.S. PATENT DOCUMENTS

| 1,131,401 | A | * | 3/1915 | MacPherson | ............... 192/89.27 |
| 3,157,257 | A | * | 11/1964 | Root | ............... 192/18 A |
| 3,285,379 | A | * | 11/1966 | Helquist | ............... 192/85.34 |
| 3,306,407 | A |   | 2/1967 | Smirl | |
| 3,353,641 | A | * | 11/1967 | Chana | ............... 192/85.34 |
| 3,497,046 | A |   | 2/1970 | Schilling | |
| 3,497,049 | A |   | 2/1970 | Schilling | |
| 3,753,478 | A |   | 8/1973 | Shiber | |
| 4,418,807 | A |   | 12/1983 | Raines | |
| 4,427,102 | A |   | 1/1984 | Schilling | |
| 4,502,582 | A |   | 3/1985 | Lech, Jr. et al. | |
| 4,664,240 | A | * | 5/1987 | Majima et al. | ............... 192/85.49 |
| 4,792,029 | A | * | 12/1988 | Andre | ............... 192/85.42 |
| 5,035,305 | A | * | 7/1991 | Lammers | ............... 188/71.5 |
| 6,000,518 | A |   | 12/1999 | Koskinen | |
| 6,116,399 | A |   | 9/2000 | Drexl et al. | |

FOREIGN PATENT DOCUMENTS

| DE | 694 864 C | 8/1940 |
| DE | 694864 | 8/1940 |
| DE | 1 829 626 | 4/1961 |

(Continued)

OTHER PUBLICATIONS

Russian Office Action dated Dec. 19, 2007 including English translation (Fifteen (15) pages).

(Continued)

*Primary Examiner* — Richard M. Lorence
(74) *Attorney, Agent, or Firm* — Crowell & Moring LLP

(57) ABSTRACT

A pressure-regulated friction clutch is provided including a cylinder-piston unit, operated by a pressure medium, which permits a frictional connection of an output shaft with a driven plate fixed thereto and an input shaft with a driving plate fixed thereto, for the transmission of a torque from the input shaft with a permanently pressurized cylinder-piston unit.

7 Claims, 1 Drawing Sheet

FOREIGN PATENT DOCUMENTS

| | | |
|---|---|---|
| DE | 1 829 626 U | 4/1961 |
| DE | 32 01 140 C2 | 1/1983 |
| DE | 31 43 434 A1 | 5/1983 |
| DE | 197 46 538 A1 | 4/1999 |
| DE | 197 50 249 A1 | 5/1999 |
| EP | 0 311 285 | 4/1989 |
| FR | 636.240 | 4/1928 |
| FR | 636 240 | 4/1928 |
| FR | 2 692 950 A1 | 12/1993 |
| GB | 725688 | 3/1955 |
| GB | 1130215 | 10/1968 |
| GB | 1392264 | 4/1975 |
| JP | 3-194217 A | 8/1991 |
| JP | 4-351326 A | 12/1992 |
| JP | 4-357335 A | 12/1992 |
| JP | 6-341462 A | 12/1994 |
| JP | 10-47381 A | 2/1998 |
| JP | 11-247894 A | 9/1999 |
| JP | 2002-70888 A | 3/2002 |
| JP | 2003-156069 A | 5/2003 |

OTHER PUBLICATIONS

German Opposition dated Oct. 5, 2009 including English translation (Sixteen (16) pages).

* cited by examiner

PRESSURE-REGULATED FRICTION CLUTCH

BACKGROUND AND SUMMARY OF THE INVENTION

The invention relates to a pressure-regulated friction clutch, particularly to be used in automated shift transmissions of motor vehicles.

Friction clutches are normally used in vehicles, predominantly in passenger cars. In this case, the friction clutch is used for the transmission of a torque produced by an input shaft—the engine shaft—to the output shaft, which establishes the connection with a connected shift transmission. Shifting operations are required for this purpose which ensure an optimized torque transmission. The shifting operations are usually carried out manually by the driver. However, current tendencies which demand a higher shifting comfort, increase the demand for automated shifting operations.

Mechanical clutches in vehicle transmissions are generally known which, by means of a prestressing force, permit a transmission of a torque and, by way of a disengaging lever or central disengaging device, eliminate the prestressing force for the purpose of shifting the clutch. In this case, the prestressing force usually applied by cup springs is manually or automatically taken out by an opposite force of a disengaging system so that no torque is transmitted anymore, and the transmission can be shifted.

Such a friction clutch of the above-mentioned type is known from German Patent document DE 197 46 538 A1. The solution indicated there relates to a hydraulically actuated disengaging system for a vehicle friction clutch consisting of a cylinder-piston unit, in which an annular piston is displaceably guided to which a clutch release bearing is fastened on the end side which, acted upon by force by means of a pressure spring, is supported on the friction clutch.

It is a disadvantage of this solution that, for eliminating the torque transmission, a force must be applied which exceeds the prestressing force, and requires that the disengaging system have correspondingly large dimensions. Furthermore, this spring-accumulator unit, usually because of the spring, has a tapering characteristic force/path curve which is not very suitable for the installation in an automated shift transmission.

From U.S. Patent document U.S. Pat. No. 4,418,807, a pressure-regulated friction clutch of the above-mentioned type is known. Here, the torque is transmitted from the input shaft to the output shaft in that a permanent admission of pressure medium takes place to a cylinder-piston unit integrated in the friction clutch. This solution therefore teaches away from the above-discussed spring-accumulator principle. Since, for operating the clutch, several rocker arms swivellably arranged within the friction clutch are to be provided, this solution requires fairly high construction expenditures and therefore correspondingly high mounting expenditures.

It is therefore an object of the present invention to provide a friction clutch which, on the one hand, permits smaller installation dimensions and, on the other hand, permits a direct coupling with a linear characteristic force/path curve for the preferred use in an automated shift transmission.

This object is achieved by means of a pressure-regulated friction clutch particularly for motor vehicles, which comprises a pressure-medium operable cylinder-piston unit, in order to establish a force-locking connection between an output shaft having a driven disc stationarily arranged thereon and an input shaft having a driving disc stationarily arranged thereon, for the transmission of a torque of the input shaft as a result of a permanent admission of pressure medium to the cylinder-piston unit. Advantageous further developments of the invention are described and claimed herein.

The invention includes the technical teaching that the friction clutch comprises a pressure-medium-operable cylinder-piston unit which permits a force-locking connection of an output shaft with a driven disc stationarily arranged thereon and an input shaft with a driving disc stationarily arranged thereon for the transmission of a torque of the input shaft as a result of a permanent admission of pressure medium to the cylinder piston unit.

This solution has the advantage that the transmission of the torque takes place only when the cylinder-piston unit is acted upon. As a result, bracing springs and the like will not be necessary so that a compact cylinder-piston unit is created. The dimensions of the friction clutch are correspondingly reduced. Furthermore, because of the admission of the pressure medium, the cylinder-piston unit has a linear characteristic force/path curve, whereby the friction clutch is particularly suitable for an automated shift transmission.

For the transmission of the torque of the input shaft by way of a driving disc, devices are required on the output shaft which correspond with the driving disc. These corresponding devices are constructed in the form of a driven disc. The driven disc is stationarily arranged on the output shaft and takes along the torque of the input shaft; that is, the torque is taken up and transmitted to the output shaft. The driven disc has virtually the same advantages as the driving disc.

The driving disc and/or the driven disc are advantageously constructed in a disc-type manner. However, similar shapes, such as plates, rings and the like, are also contemplated.

It is a special advantage that the cylinder-piston unit is arranged concentrically around the output shaft in order to generate a symmetrical load.

A measure improving the invention provides that the friction clutch also has devices which are movably arranged between the cylinder-piston unit and the driven disc on the output shaft in order to implement a connection of the driving shaft with the output shaft. In this manner, the piston movement of the cylinder-piston unit can be transmitted by way of a component to the driven disc. By means of this component, the piston movement can be optimally adapted to the requirements. For example, a length compensation or an adapted force engagement point can be implemented in a simple manner. The devices have to be disposed corresponding to the required movement.

For this purpose, a clamping washer is preferably provided, which can be axially displaced on the output shaft. In this manner, the axial movement of the piston can be transmitted by way of a small-sized component which is easy to produce.

Advantageously, the clamping washer is connected with the piston of the cylinder-piston unit by way of separate connecting devices. By means of this direct connection of the clamping washer and the piston, the axial movement of the piston can be transmitted to the clamping washer without affecting a rotational movement of the clamping washer about the output shaft.

The clamping washer is preferably connected by way of a form-locking connection in an axially displaceable and co-rotatable manner with the input shaft in order to follow the rotating movement of the input shaft. As a result of the fact that the clamping washer is permanently connected with the input shaft in a co-rotatable manner, the running-up—the adapting of the rotational movement of the clamping washer from the rest position to the desired rotational movement of the input shaft—is eliminated.

It is advantageous that the clamping washer is rotatably disposed on the piston by means of a bearing. In this case, the bearing is constructed such that it permits the rotational movement and also the axial displacement of the clamping washer.

In order to separate the connection between the input shaft and the output shaft, it is advantageous for the friction clutch to have a disengaging element, which may be constructed in the manner of a spring. However, a disengaging element is not absolutely necessary because the clutch is self-disconnecting.

It is also contemplated to construct the disengaging element as an elastic element arranged in a sandwich-type manner between the clamping washer and the driven disc. By means of this arrangement, a disengaging element which is easy to produce and has small dimensions can be housed in the clutch in a space-saving manner.

In the same manner, an advantage is achieved in that the disengaging element is constructed without any preloading. As a result of the arrangement of the disengaging element, the latter is mounted without any prestressing or any other preload. The disengaging element is tensioned by the movement of the clamping washer in the direction of the input shaft.

As a result of the fact that the disengaging element has a leverless construction, more space can be saved in comparison to known disengaging systems. The entire clutch can be produced in a more compact and more space-saving manner.

The cylinder-piston unit can be constructed as a hydraulically or pneumatically operable cylinder-piston unit.

Additional measures improving the invention are described and claimed herein, or will be explained in detail in the following together with the description of a preferred embodiment of the invention by means of a single FIGURE.

DETAILED DESCRIPTION OF THE DRAWING

Figure 1:
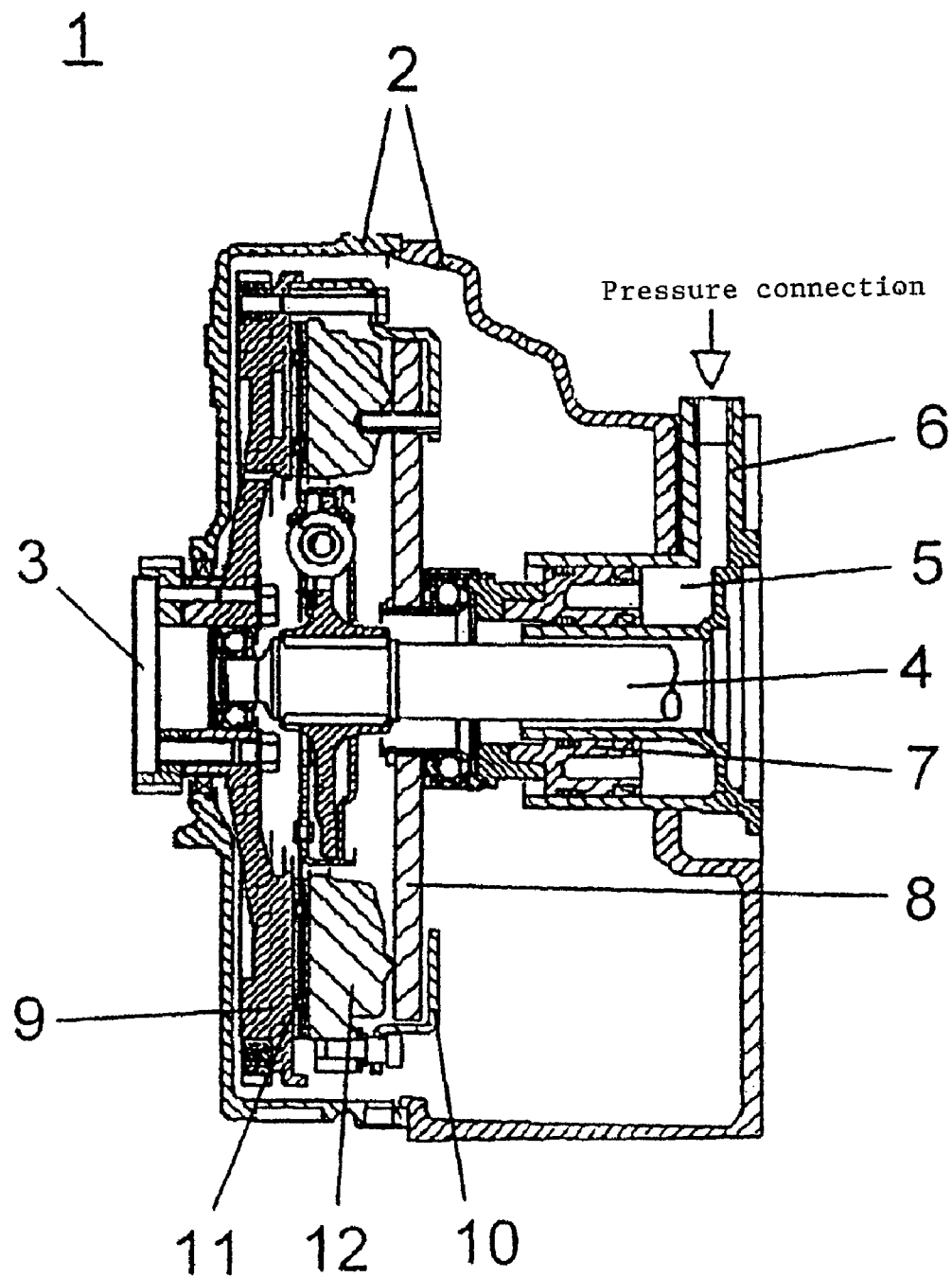
FIG. 1 is a cross-sectional view of a friction clutch according to the invention.

The friction clutch 1 illustrated in a sectional lateral view includes a friction mechanism, which is arranged in a clutch housing 2 and mutually connects or separates an input shaft 3 and an output shaft 4. The clutch mechanism is actuated by way of a cylinder-piston unit 5, which can be operated by way of a pressure medium. The pressure medium feed 6 to the cylinder-piston unit 5 is implemented by way of a connection piece 6. By way of the connection piece 6, a pressure medium, preferably air, flows into the cylinder-piston unit 5 concentrically arranged around the output shaft 4. As a result, the piston 7, constructed as a ring piston of the cylinder-piston unit, is moved axially in the direction of the input shaft 3.

The piston 7 transmits the axial movement to a clamping washer 8, which is rotatably disposed about the output shaft 4. The clamping washer 8 is formlockingly connected with the input shaft 3 by way of guide pins and by way of a driving disc 9 stationarily arranged on the input shaft 3, so that the clamping washer 8 is axially displaceably disposed on the output shaft 4 and simultaneously follows the rotating movement of the input shaft 3. The axial movement of the clamping washer 8 is bounded in the axial direction by angular metal sheets 10. In this manner, it is ensured that the clamping washer 8 is always connected with the input shaft 3.

A driven disc 11 and a disengaging element 12 are arranged between the clamping washer 8 and the driving disc 9. The driven disc 11 is stationarily arranged on the output shaft 4 and slides along the driving disc 9.

During an axial movement of the piston 7, and thus also of the clamping washer 8 in the direction of the input shaft 3, the disengaging element 12 arranged in a sandwich-type manner between the driven disc 11 and the clamping washer 8 is compressed. As a result of the clamping of the driving disc 9, the driven disc 11, the disengaging element 12 and the clamping washer 8, a force-locking connection is established between the driving disc 9 and the driven disc 11 and thus between the input shaft 3 and the output shaft 4. The driving torque of the input shaft 3 is transmitted to the output shaft 4; the clutch is engaged. During the engaged condition, the piston 7 of the cylinder-piston unit 5 is permanently acted upon by pressure. If the clutch now is to be disengaged, the pressure is reduced. As a result, the disengaging element 12 expands to its original size and displaces the clamping washer 8 axially in the direction of the output shaft 4.

TABLE OF REFERENCE NUMBERS

1 Friction clutch
2 clutch housing
3 input shaft
4 output shaft
5 cylinder-piston unit
6 connection piece
7 piston
8 clamping washer
9 driving disc
10 metal sheet
11 driven disc
12 disengaging element

The invention claimed is:

1. A pressure-regulated friction clutch for a motor vehicle, comprising:
    an output shaft having a driven disc stationarily arranged thereon;
    an input shaft having a driving disc stationarily arranged thereon;
    a pressure-medium operable cylinder-piston unit operatively arranged to establish a force-locking connection between the output shaft and the input shaft for transmitting a torque of the input shaft as a result of admission of pressure medium into the cylinder-piston unit;
    a disengaging element for separating a connection between the input shaft and the output shaft, wherein the disengaging element comprises an elastic element operatively arranged axially between the cylinder-piston unit and the driven disc and is constructed without any preload and lever; and
    at least one device movably arranged between the cylinder-piston unit and the elastic element on the output shaft to implement a coupling of the input shaft with the output shaft,
    wherein
        said at least one device comprises a clamping washer axially displaceable on the output shaft.

2. The pressure-regulated friction clutch according to claim 1, wherein the clamping washer is coupled with a piston of the cylinder-piston unit via at least one connection device for transmitting the axial movement of the piston to the clamping washer.

3. The pressure-regulated friction clutch according to claim 2, wherein the clamping washer is axially, displaceably, and simultaneously co-rotatably coupled by way of a form-locking connection with the input shaft in order to follow the rotational movement of the input shaft.

4. The pressure-regulated friction clutch according to claim 3, wherein the clamping washer is rotatably disposed via a bearing on the output shaft.

5. The pressure-regulated friction clutch according to claim 1, wherein the cylinder-piston unit is a pneumatically operable cylinder-piston unit.

6. The pressure-regulated friction clutch according to claim 1, wherein said friction clutch has a linear characteristic force/path curve in order to provide a comfortable shifting operation.

7. The pressure-regulated friction clutch according to claim 1, further comprising:
a clutch housing for the friction clutch; and
wherein the cylinder-piston unit is exchangeably mounted on the clutch housing as a separate constructional unit.

* * * * *